Oct. 11, 1938.  A. J. MAAHS  2,132,636
PIPE ASSEMBLY
Filed March 30, 1937
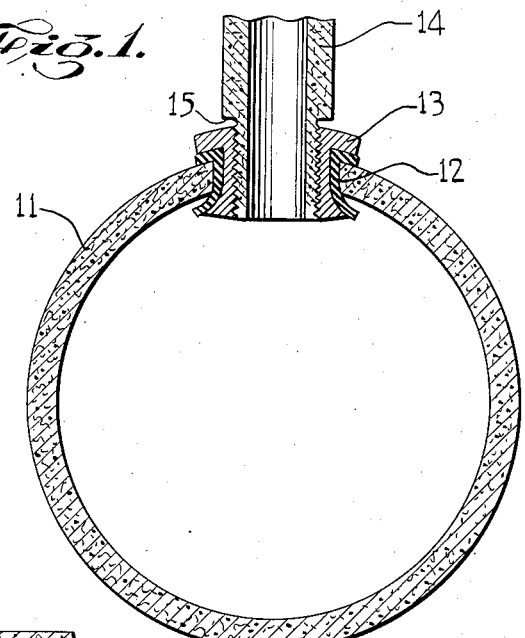
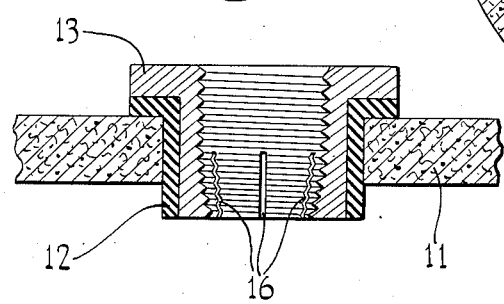
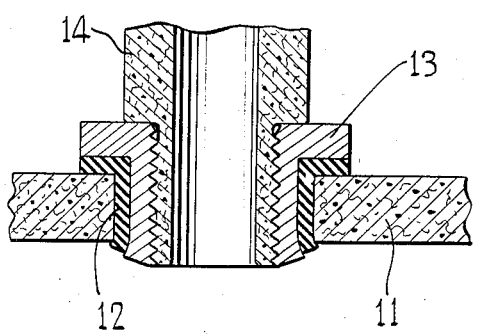
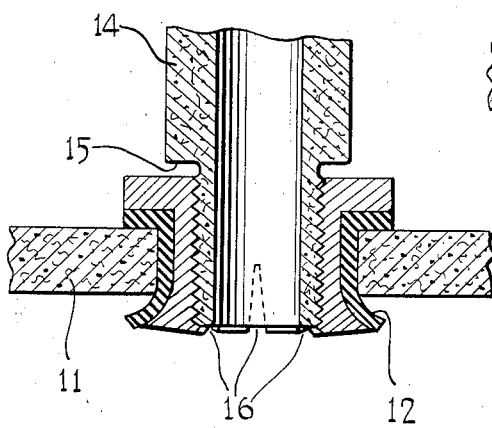
INVENTOR
Arthur J. Maahs.
BY Virgil C. Kline
ATTORNEY Patented Oct. 11, 1938

2,132,636

UNITED STATES PATENT OFFICE 2,132,636

PIPE ASSEMBLY

Arthur J. Maahs, White Plains, N. Y., assignor to Johns-Manville Corporation, New York, N. Y., a corporation of New York Application March 30, 1937, Serial No. 133,759

1 Claim. (Cl. 285—52)

This invention relates to a pipe assembly.

It is an object of the invention to provide an assembly including a branch pipe joined to another member, as, for instance, to another larger pipe through a hole in the side thereof, the said assembly to be liquid tight and to permit some lateral as well as lengthwise shifting of the pipe or said member or both.

The invention comprises the herein described assembly and the method of making it. More particularly, the invention comprises a member provided with a hole in the side thereof, a yieldable gasket lining the wall of the hole, an expanded bushing holding the gasket tightly against the said wall and having a threaded interior, and a threaded end of a pipe engaged within the said threaded interior.

The embodiment of the invention which is preferred at this time is illustrated in the attached drawing and will be described, for the purpose of exemplification, in connection therewith.

Fig. 1 is a transverse sectional view of an assembly made in accordance with the invention.

Fig. 2 is a sectional view of a portion of an assembly before the expansion of the bushing therein.

Fig. 3 is a similar view of the same assembly when completed.

Fig. 4 is a similar view of a modification of the invention.

The scale used in Figs. 2, 3, and 4 is somewhat enlarged as compared to the scale of Fig. 1.

In making the assembly of the present invention, there is provided a member 11, say, a flat sheet, wall, or pipe having a hole in the side thereof. This hole should be circular, that is, of the shape formed by a drill whose cross section is approximately a true circle and whose axis, at the time of drilling, in the case of a pipe being drilled, is an extension of a radius of the pipe.

Once a hole is formed, there is inserted thereinto the yieldable gasket liner 12 and then the expansible bushing 13. Both the gasket and the bushing preferably extend completely through the hole and somewhat therebeyond, on both the outside and the inside. The bushing as inserted (Fig. 2) should fit moderately snugly against the inside of the gasket, just as the gasket as inserted should fit against the wall of the hole.

The bushing has initially a portion that, on the outside, is of cylindrical form but has an inner diameter that becomes gradually less, from a certain point towards the inner end of the bushing. In other words, the thickness of wall of the bushing increases gradually from the said point towards the inner end of the bushing. Furthermore, the bushing is provided with a threaded interior adapted to conform to and engage the threads on the outside of the end of the pipe 14.

When the threaded end of the pipe 14 is screwed home within the bushing, the threaded end of the pipe being of approximately uniform diameter, the bushing is expanded at the portions thereof having the wall of increasing thickness, so that the lower part of the bushing is flared and caused to hold the gasket tightly against the wall of the hole in the member 11.

Preferably the bushing and gasket have shoulders, that is, flanges, at the outer portions thereof, which shoulders extend over the outer side of the wall of the member 11, as illustrated. The flange on the bushing extends outwardly over the gasket, from the end of the bushing remote from the end of greater thickness of wall.

Also, the expansion of the bushing, causes it, at its widest point, to have preferably a larger diameter than the diameter of the hole in the member 11. In other words, the bushing and gasket may extend laterally beyond the hole in the said member, both on the inside and outside thereof. The result of these features is the firm locking of the gasket and bushing in position.

When it is desired to make an assembly that may be taken apart by pulling the bushing out of the hole, without collapsing the bushing in part, the expanded portion of the bushing may be maintained at all times slightly narrower than the width of the said hole. For example, the outside diameter of the expanded bushing may be less than the diameter of the hole by about the thickness of the gasket, or by an amount that is slightly less than this thickness when the gasket is constituted of a resilient readily compressible rubber composition or the like (see Fig. 4).

Also, the pipe 14 may be provided with a shoulder 15 which limits the extent to which the pipe may be inserted inside the bushing.

In order to minimize splitting of the bushing during the expansion of it, the bushing may be provided with slits (slots) 16 extending lengthwise thereof, in the portion of the bushing that is to be expanded. Suitably, there are a plurality of these slits spaced equally around the bushing, say, at 60° to 120° intervals.

Since the hole in the member 11 is not a true circle, except in plan view, when the member 11 is the wall of a pipe, but is actually saddle-shaped in its periphery, the gasket and/or bushing used in joining the two pipes in the manner described are exteriorly generally saddle-shaped, the central portion being omitted, as illustrated in Fig. 1.

While I prefer to use a resiliently yieldable gasket such as one containing a large proportion of rubber or neoprene (polymerized chloroprene of rubbery consistency), I may use, for some purposes, a gasket constituted of a thick sheet of lead or like yieldable material.

The bushing should be so rigid that the threads thereon will hold the conforming threads on the pipe 14 and yet should be expansible without cracking to an objectionable degree. As the material of construction of the bushing, there may be used a soft annealed copper, soft brass, or other soft expansible alloy, the slits being preferably used, as described, to minimize cracking. When the diameter of the bushing is large or when the material composing it is not extremely soft and readily expansible, then the slits 16 may be spaced relatively close together, as, for example, every 20° to 45° or so.

The assembly made as described is particularly useful in joining two pipe lines, as, for example, in connecting a service line to a larger or main line. The assembly maintains a tight union of the two pipe lines while, at the same time, permitting an appreciable movement of one with respect to the other. Furthermore, the assembly is easily and conveniently made, especially when the pipes being joined are made of the preferred composition, namely, an intimate mixture of asbestos fibres and cement in strongly compressed and then hardened condition.

The details given are for the purpose of illustration, not restriction, and variations within the spirit of the invention are intended to be included in the scope of the appended claim.

What I claim is:

A device, for joining a branch pipe including a threaded end portion to a larger pipe provided with a circular aperture in a side thereof, said device comprising a bushing adapted to be fitted into the aperture and having a slotted end portion of greater wall thickness than the remainder of the bushing; a yieldable gasket surrounding the bushing; a flange on the bushing extending outwardly over the gasket, from the end of the bushing remote from the slotted end; and means for screwing the end of the branch pipe into the bushing, for expanding the slotted end thereof and causing it to force the gasket firmly against the edges of the said aperture, so that the bushing and gasket become clamped within the aperture.

ARTHUR J. MAAHS.